(12) United States Patent
Jiang et al.

(10) Patent No.: US 10,908,704 B2
(45) Date of Patent: Feb. 2, 2021

(54) MOUSE

(71) Applicant: Xindong Jiang, Guangxi (CN)

(72) Inventors: Xindong Jiang, Guangxi (CN); Fang Xu, Guangxi (CN)

(73) Assignee: Xindong Jiang, Guangxi (CN)

( * ) Notice: Subject to any disclaimer, the term of this patent is extended or adjusted under 35 U.S.C. 154(b) by 0 days.

(21) Appl. No.: 16/603,806

(22) PCT Filed: Mar. 23, 2018

(86) PCT No.: PCT/CN2018/080374
§ 371 (c)(1),
(2) Date: Apr. 1, 2020

(87) PCT Pub. No.: WO2018/184478
PCT Pub. Date: Oct. 11, 2018

(65) Prior Publication Data
US 2020/0233505 A1    Jul. 23, 2020

(30) Foreign Application Priority Data

Apr. 8, 2017   (CN) .......................... 2017 1 0225990

(51) Int. Cl.
*G06F 3/0354*   (2013.01)
*G01P 3/36*     (2006.01)
*G06F 3/03*     (2006.01)

(52) U.S. Cl.
CPC .......... *G06F 3/03544* (2013.01); *G01P 3/366* (2013.01); *G06F 3/0317* (2013.01); *G06F 2203/0334* (2013.01)

(58) Field of Classification Search
CPC ... G06F 3/0354–03544; G06F 3/03545; G06F 3/0304; G06F 3/005; G06F 3/03543; G06F 3/01
See application file for complete search history.

(56) References Cited

FOREIGN PATENT DOCUMENTS

| CN | 101080690 A | 11/2007 |
|----|-------------|---------|
| CN | 105425989 A | 3/2016  |
| CN | 106648166 A | 5/2017  |

*Primary Examiner* — Sanjiv D. Patel
(74) *Attorney, Agent, or Firm* — Robert L. Stearns; Dickinson Wright PLLC

(57) ABSTRACT

A mouse including a housing, an image sensing element, a lens, or a laser Doppler cursor positioning sensor; a light-transmitting hole is located where the housing is intersected with a third plane, the third plane is defined by an edge intersecting a first plane and a second plane and a halving line of an angle of the first plane and the second plane; a light source is provided and configured to emit a light beam from the light-transmitting region to the working surface, and the lens is configured to focus a reflected light of the light beam on the working surface to be transmitted to the image sensing element through the light-transmitting hole; or the laser Doppler cursor positioning sensor is configured to project a light from the light-transmitting region to the working surface, and a reflected light is also fed back to the sensor through the light-transmitting hole.

16 Claims, 11 Drawing Sheets

MOUSE

CROSS-REFERENCE TO RELATED APPLICATION

This application is a 35 U.S.C. § 371 national stage application of PCT Applicaton Serial No. PCT/CN2018/080374 filed on Mar. 23, 2018, which claims priority to Chinese Patent Application Ser. Nos. CN20170225990.2, filed on Apr. 8, 2017, the content of each are hereby incorporated by reference in their entireties.

TECHNICAL FIELD

The present application relates to the technical field of input device of computer, and more particularly to a mouse.

BACKGROUND TECHNOLOGY

Many people today need to operate the computer for a long time. The mouse is one of the most important input devices of the computer. The pain of the palm, wrist and arm caused by the long operation of the mouse is plaguing people.

Studies have found that the root cause of strain and pain and even "mouse hand" illness is a long-term single rigid hand posture.

Chinese Patent Application Publication No. CN105425989 discloses an operating posture that can change the wrist and the palm, and can be used both horizontally and vertically. The mouse has two holding modes, the wrist got the beneficial activities of rotating and turning through the changing between holding the mouse in a horizontal position and holding the mouse in a vertical position, and different fingers are turned to control the roller, which relax and relieve the index finger and middle finger that are the most fatigued due to virtual suspension above the roller. However, the mouse disclosed in the application has a small contact area between the rear end of the housing and the working surface when the housing is upright or oblique to the working surface to slide on the working surface to sense the movement of the cursor, which may cause an unstable shaking and result in a frame loss; in addition, the height of the button relative to the working surface is moved up, and the center of gravity of the mouse is also moved up, and the mouse is also likely to sway to the inside of the wrist resulting in a frame loss when the button is operated.

SUMMARY

The present application provides a mouse, including:
a housing, including a bottom portion, a front end and a rear end;
an image sensing element, including a photosensitive surface; and
a lens;
wherein further provides a light-transmitting region disposed at the housing and located where the housing is intersected with a third plane, the third plane is defined by an edge intersecting a first plane and a second plane and a halving line of an angle of the first plane and the second plane; wherein the first plane is a plane on which the bottom portion of the housing contacts with a working surface when the mouse is in a state being placed and slid onto the working surface with the bottom portion of the housing to sense a moving of a cursor, and the second plane is a plane on which the rear end of the housing contacts with a working surface when the mouse is in a state being placed and slid onto the working surface to sense the moving of the cursor with the front end of the housing being on a top and the rear end thereof being on a bottom, and the rear end of the housing being placed on the working surface; and
wherein a light source is further provided to emit a light beam from the light-transmitting region to the working surface, and the lens is configured to focus a reflected light of the light beam from the working surface to transmit it to the image sensing element through the light-transmitting region;
or alternatively, the mouse comprising:
a housing, including a bottom portion, a front end and a rear end; and
a laser Doppler cursor positioning sensor;
wherein further provides a light-transmitting region disposed at the housing and located where the housing is intersected with a third plane, the third plane is defined by an edge intersecting a first plane and a second plane and a halving line of an angle of the first plane and the second plane; wherein the first plane is a plane on which the bottom portion of the housing contacts with a working surface when the mouse is in a state being placed and slid onto the working surface with the bottom portion of the housing to sense a moving of a cursor, and the second plane is a plane on which the rear end of the housing contacts with a working surface when the mouse is in a state being placed and slid onto the working surface to sense the moving of the cursor with the front end of the housing being on a top and the rear end thereof being on a bottom, and the rear end of the housing being placed on the working surface; and
wherein the laser Doppler cursor positioning sensor is configured to project a light from the light-transmitting region to the working surface, and a reflected light is also fed back to the sensor through the light-transmitting region.

Further, the image sensing element is configured such that when the mouse is placed on the working surface to slide at the bottom portion of the housing thereof to sense the moving state of the cursor, an angle between the photosensitive surface of the image sensing element and the working surface is $\alpha$, and when the mouse is in a state upright or oblique to the working surface with the front end of the housing being on the top and the rear end of the housing being on the bottom and the rear end of the housing being placed and slid onto the working surface, an angle between the photosensitive surface of the image sensing element and the working surface is $\beta$, and wherein the $\alpha$ is equal to the $\beta$.

Alternatively further, the image sensing element is configured such that when the mouse is in a state being placed and slid onto the working surface with the bottom portion of the housing thereof to sense the moving of the cursor an angle between the photosensitive surface of the image sensing element and the working surface is $\alpha$, and when the mouse is in a state upright or oblique to the working surface with the front end of the housing being on the top and the rear end of the housing being on the bottom and the rear end of the housing being placed and slid onto the working surface, an angle between the photosensitive surface of the image sensing element and the working surface is $\beta$, and wherein the angle difference of $\alpha$ and $\beta$ is within 30 degrees.

Further, the laser Doppler cursor positioning sensor is configured such that when the mouse is in a state being placed and slid onto the working surface with the bottom portion of the housing thereof to sense the moving of the cursor, an angle between a package substrate of the laser Doppler cursor positioning sensor and the working surface is α, and when the mouse is in a state upright or oblique to the working surface with the front end of the housing being on the top and the rear end of the housing being on the bottom and the rear end of the housing being placed and slid onto the working surface, an angle between the package substrate of the laser Doppler cursor positioning sensor and the working surface is β, and wherein the α is equal to the β. Alternatively, the laser Doppler cursor positioning sensor is configured such that when the mouse is in a state being placed and slid onto the working surface with the bottom portion of the housing thereof to sense the moving of the cursor, an angle between a bottom plane of a package housing opposite to the lens of the laser Doppler cursor positioning sensor and the working surface is α, and when the mouse is in a state upright or oblique to the working surface with the front end of the housing being on the top and the rear end of the housing being on the bottom and the rear end of the housing being placed and slid onto the working surface to sense the movement of the cursor, an angle between the bottom plane of the package housing opposite to the lens of the laser Doppler cursor positioning sensor and the working surface is β, and wherein the α is equal to the β.

Alternatively further, the laser Doppler cursor positioning sensor is configured such that when the mouse is in a state being placed and slid onto the working surface with the bottom portion of the housing thereof to sense the moving of the cursor, an angle between a package substrate of the laser Doppler cursor positioning sensor and the working surface is α, and when the mouse is in a state upright or oblique to the working surface with the front end of the housing being on the top and the rear end of the housing being on the bottom and the rear end of the housing being placed and slid onto the working surface, an angle between the package substrate of the laser Doppler cursor positioning sensor and the working surface is β, and wherein the angle difference of α and β is within 30 degrees. Alternatively, the laser Doppler cursor positioning sensor is configured such that when the mouse is in a state being placed and slid onto the working surface with the bottom portion of the housing thereof to sense the moving of the cursor, an angle between a bottom plane of a package housing opposite to the lens of the laser Doppler cursor positioning sensor and the working surface is α, and when the mouse is in a state upright or oblique to the working surface with the front end of the housing being on the top and the rear end of the housing being on the bottom and the rear end of the housing being placed and slid onto the working surface to sense the movement of the cursor, an angle between the bottom plane of the package housing opposite to the lens of the laser Doppler cursor positioning sensor and the working surface is β, and wherein the angle difference of α and β is within 30 degrees.

In a better embodiment of the present application, the light-transmitting region is disposed at an edge where a bottom surface of the housing is intersected with a rear end surface of the housing. The mouse is in a state being placed and slid onto the working surface with the bottom portion of the housing thereof to sense the moving of the cursor refers to a using state of a horizontal type, and the bottom portion of the housing is slid on the working surface or a gasket mounted on the bottom portion of the housing and configured to in contact with the working surface is slid on the working surface. The mouse being in a state upright or oblique to the working surface with the front end of the housing being on the top and the rear end of the housing being on the bottom and the rear end of the housing being placed and slid onto the working surface refers to a using state of a vertical type, and the rear end of the housing is slid on the working surface or a gasket mounted on the rear end and configured to in contact with the working surface is slid on the working surface.

In another better embodiment of the present application, the light-transmitting region is disposed at an edge where a bottom surface of the housing is intersected with an extending plane of a rear end surface of the housing. During the using state of the horizontal type, the bottom portion of the housing is slid on the working surface or a gasket mounted on the bottom portion of the housing and configured to in contact with the working surface is slid on the working surface. During the using state of the vertical type, the rear end of the housing is slid on the working surface or a gasket mounted on the rear end and configured to in contact with the working surface is slid on the working surface.

Further arrangements of the application will be explained in the following detailed description.

Beneficial Effects

The beneficial effect of the mouse provided by the present application is that, due to the arrangement of the light-transmitting region of the mouse of the present application, the image sensing element or the laser Doppler cursor positioning sensor can still obtain the reflected light of the same region on the working surface from the arranged light-transmitting region when the mouse being vertically slid or obliquely slid on the working surface is oblique to the inner side of the wrist; when the mouse is corrected from oblique and back, the image sensing element or laser Doppler cursor positioning sensor can still obtain the reflected light from the light-transmitting region to the same region on the working surface, that is, the reflected light of the same light-transmitting region can still be obtained during the reciprocating process of the mouse shaking. Therefore, in the state in which the mouse is in a using state of the vertical type, the shaking inside to the wrist when the mouse is slid and the shaking caused by the button operation are avoided causing a frame loss of the mouse since the technical solution of the present application.

DETAILED DESCRIPTION

Figure 1:
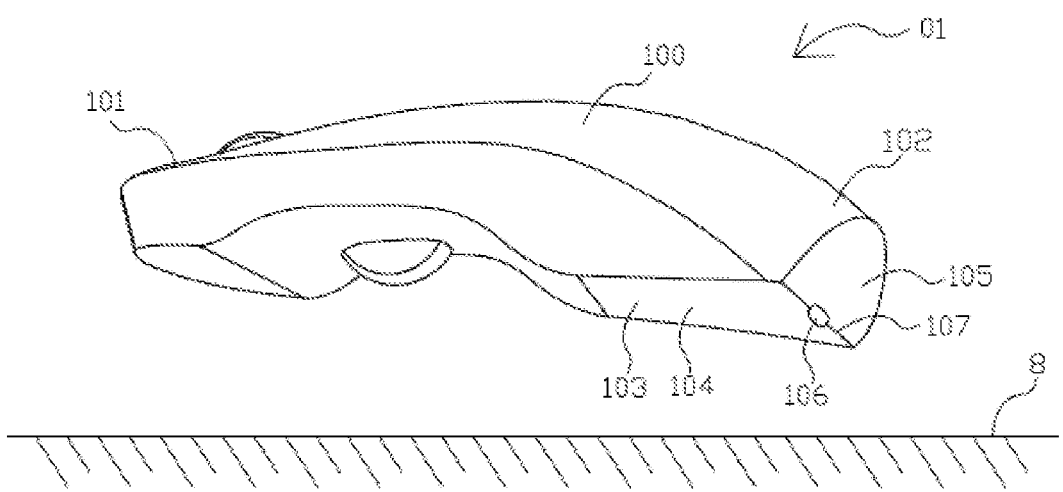
FIG. 1 shows a mouse in a state at a bottom of a housing thereof faces a working surface according to a first embodiment of the present application.

In order to make the technical problems to be solved, technical solutions and beneficial effects by the present application more clear, the present application will be further described in detail below with reference to the accompanying drawings and embodiments. Other objects and further aspects and advantages of the present invention will become apparent from the following description taken in conjunction with the accompanying drawings. It is to be understood that disclosed embodiments are merely illustrative of the various forms of the present application, and the specific structural and functional details of the disclosure are not to be construed as limitation. The reference numerals cited in the specification are only used to assist the understanding of the present application and are not intended to limit the application.

First Embodiment

Figure 2:
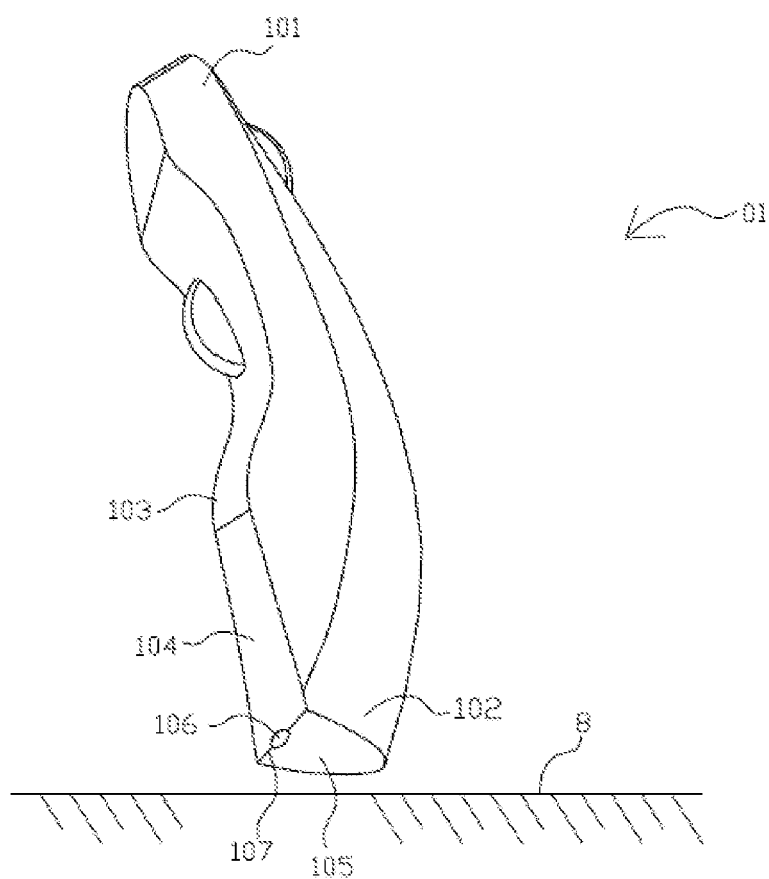
FIG. 2 shows a mouse in a state upright or oblique to a working surface in which a front end of a housing is on a top and a rear end of the housing is on a bottom according to a first embodiment of the present application.
Figure 3:
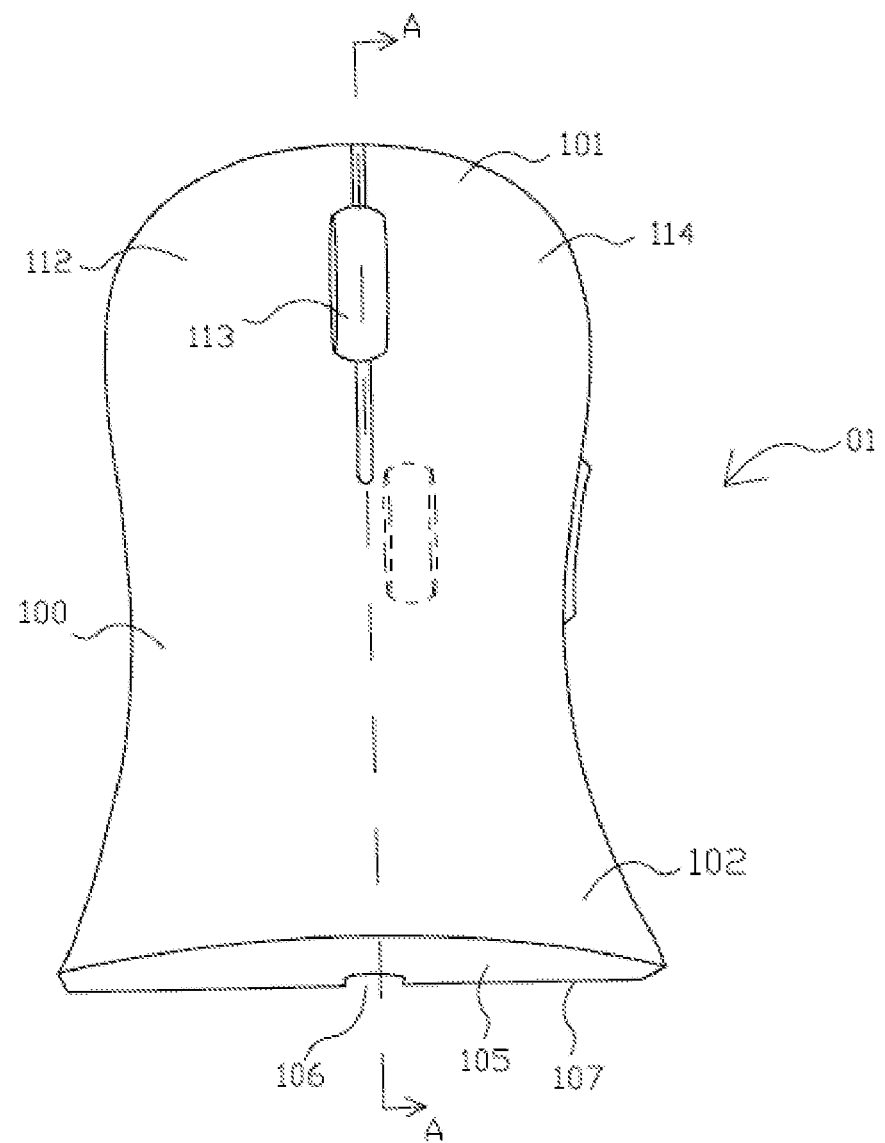
FIG. 3 is a perspective view of a mouse from top view according to a first embodiment of the present application.
Figure 4:
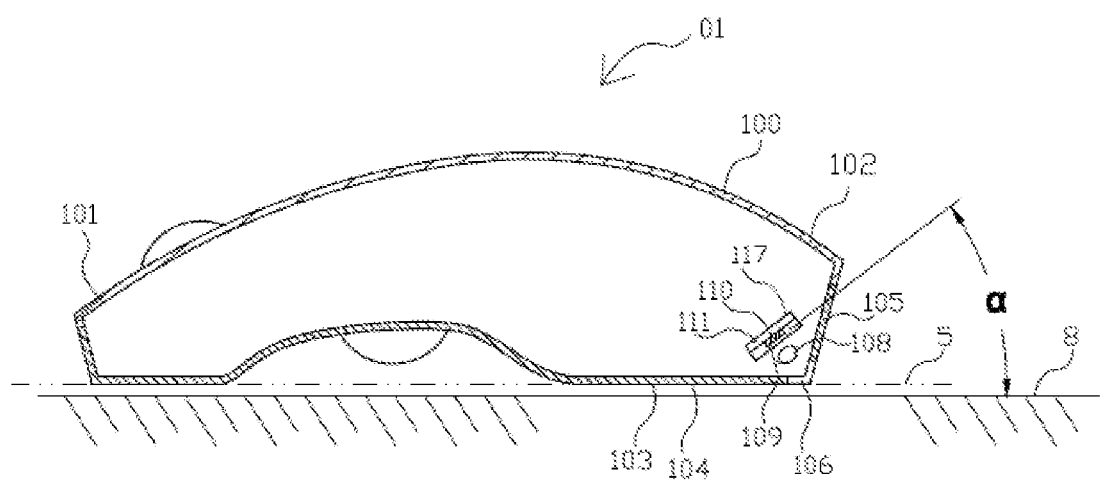
FIG. 4 is a schematic view of a housing, a light-transmitting hole, a lend, an image sensing element and the like in a state where the mouse is placed on the working surface to slide at a bottom of the housing thereof in the A-A cross-section shown in FIG. 3.
Figure 5:
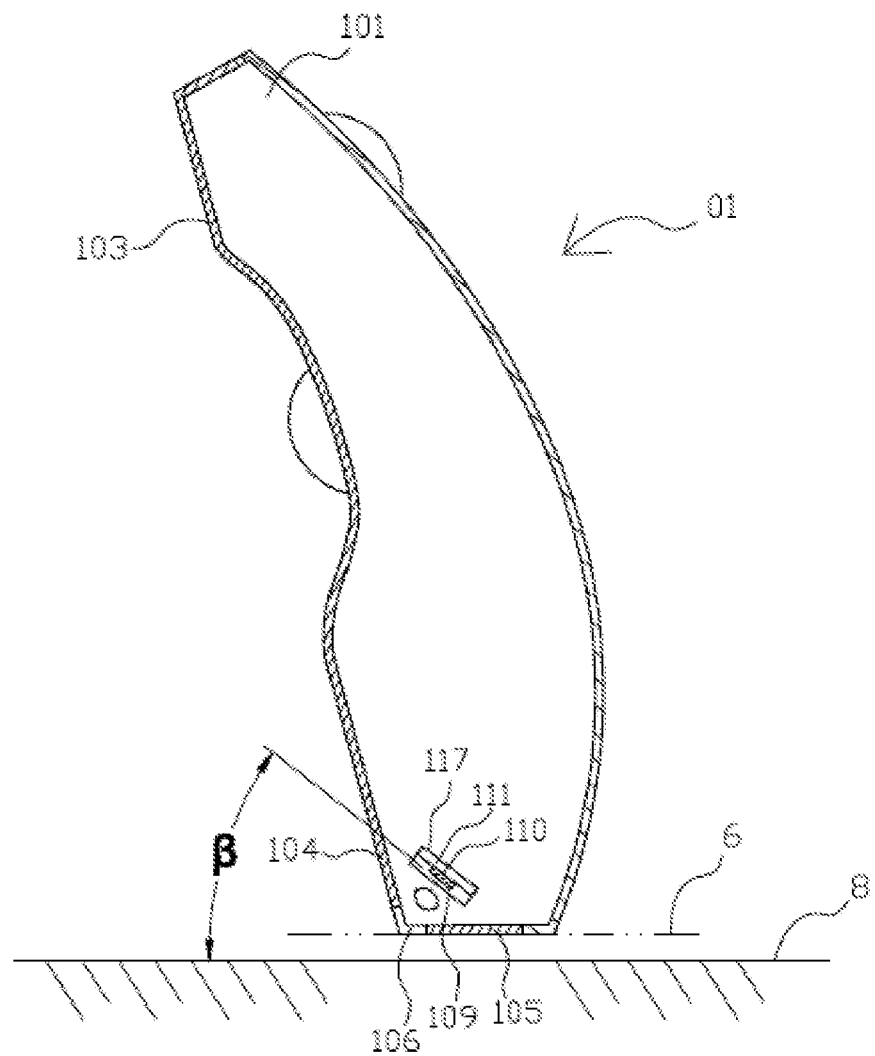
FIG. 5 is a schematic view of a housing, a light-transmitting hole, a lend, an image sensing element and the like in a state where the mouse is upright or oblique to the working surface with the front end of the housing being on the top and the rear end of the housing being on the bottom and the rear end of the housing being placed and slid onto the working surface in the A-A cross-section shown in FIG. 3.

Please refer to FIG. 1 to FIG. 6. FIG. 1 shows a mouse 01 in a state at a bottom portion 103 of a housing faces a working surface 8 according to a first embodiment of the present application, that is: the mouse 01 is placed in the state of the working surface with the bottom portion of the housing like the conventional ordinary mouse. FIG. 2 shows the mouse 01 in a state upright or oblique to the working surface 8 in which a front end of the housing is on a top and a rear end of the housing is on a bottom. The mouse 01 of the present embodiment will be described below with reference to FIGS. 1 to 6.

The mouse 01 includes a housing 100, and an image sensing element 110 and a lens 108. The housing includes a bottom portion 103, a front end 101, and a rear end 102. An upper surface of the front end of the housing is provided with a left button 112, a right button 114 and a roller 113 as a main buttons in a state when the bottom portion of the housing is placed on the working surface to slide. The image sensing element 110 is packaged in a housing 111 of an integrated IC that may include other functional modules. The image sensing element 110 includes a photosensitive surface 109.

A light-transmitting region 106 is disposed at the edge 107 where the rear end surface 105 of the housing 100 intersects with the bottom surface 104 of the housing. The center of the light-transmitting region 106 is exactly located on the edge 107. In the present embodiment, the light-transmitting region 106 is a light-transmitting hole 106 as shown. A light source is provided and configured to emit a light beam from the light-transmitting hole 106 to the working surface; and a lens is provided and configured to focus the reflected light of the light beam on the working surface to be transmitted to the image sensing element 110. Due that the arrangement of the light-transmitting hole 106, when the mouse is in a state being placed and slid onto the working surface 8 with the bottom portion 103 of the housing thereof to sense the moving of the cursor, and the mouse is in a state upright or oblique to the working surface with the front end of the housing being on the top and the rear end of the housing being on the bottom and the rear end surface 105 of the rear end 102 of the housing being placed and slid onto the working surface, the light beam is projected to the working surface through the same light-transmitting region 106, and the reflected light passes through the same light-transmitting region 106 returns to the image sensing element 110. The light beam is not obscured by the edge of the bottom surface of the housing that intersects with the rear end of the housing.

For the further arrangement of the embodiment, the mouse is in a state being placed and slid onto the working surface with the bottom portion of the housing thereof to sense the moving of the cursor, an angle between the photosensitive surface 109 of the image sensing element 110 and the working surface 8 is α; the mouse is in a state upright or oblique to the working surface with the front end of the housing being on the top and the rear end of the housing being on the bottom and the rear end of the housing being placed and slid onto the working surface, an angle between the photosensitive surface 109 of the image sensing element and the working surface 8 is β, and wherein the α is equal to the β. Therefore, Therefore, in the using state of the horizontal type and the using state of the vertical type, an imaging angle of the image sensing element when acquiring the image on the working surface through the light-transmitting hole 106 is consistent, in order to benefit from the two states described, and the sensitivity of the mouse remains the same.

As described above, when the mouse is in a state upright or oblique to the working surface with the front end of the housing being on the top and the rear end of the housing being on the bottom and the rear end of the housing being placed and slid onto the working surface to sense the movement of the cursor, a sharking due to unstable standing is likely to occur. Since the state of saving labor is that the palm is turned to the inside of the wrist when the palm of the person holds an object similar to a standing mouse on the palm surface substantially perpendicular to the working surface, thereby the shaking of the mouse is mostly started from the standing mouse being turned to the inside of the wrist. Due that the arrangement of the light-transmitting region of the mouse of the present embodiment, the light-transmitting hole 106 is disposed at the edge 107 of the rear end surface 105 of the housing intersected with the bottom surface 104 of the housing, and the light beam is not blocked by the edge 107 where the two intersect. When the mouse that is upright or oblique to the working surface is to be turned to the inside of the wrist, the edge 107 is actually the fulcrum portion of the housing of the mouse at this time, and the mouse is oblique to the inside of the wrist at the fulcrum point until an oblique angle occurs, due that the arrangement of the light-transmitting region 106 of the mouse 01 and the arrangement of the image sensing element 110, the image sensing element can still obtain an image of the same region on the working surface from the light-transmitting hole 106 at the edge; when the mouse is corrected from the oblique position, the image sensing element can still obtain the image of the same region on the working surface from the light-transmitting hole 106, that is, the continuous image of the same light-transmitting region can still be obtained during the reciprocating process of the mouse shaking. Therefore, in the state in which the mouse is used in vertical type, the shaking inside to the wrist when the mouse is slid and the shaking caused by the button operation are avoided causing a frame loss of the mouse since the technical solution of the present application.

In other embodiments of the present application, the light-transmitting region may be one of a group of a light-transmitting hole, a light-transmitting plate, a light-transmitting sheet and a light-transmitting slit.

The image sensing element can be a complementary metal oxide semiconductor (CMOS) image sensor or a charge coupled device.

The photosensitive surface is, for example, in a complementary metal oxide semiconductor image sensor or a charge coupled image sensor, parallel to the surface of the photosensitive pixel matrix.

In a mouse integrated IC integrated with a CMOS image sensor commonly used in the industry, the photosensitive surface of the image sensing element is generally parallel to a flat front or rear surface of the package housing of the integrated IC. In the design and manufacture of the finished mouse product, in this embodiment as an example, a flat front or rear surface 117 of the package housing 111 of the integrated IC may be disposed, and when the mouse is in a state being placed and slid onto the working surface with the bottom portion of the housing thereof to sense the moving of the cursor, an angle between the photosensitive surface of the image sensing element and the working surface 8 is α, and when the mouse is in a state upright or oblique to the working surface with the front end of the housing being on the top and the rear end of the housing being on the bottom and the rear end of the housing being placed and slid onto the working surface to sense the moving of the cursor, an angle between the photosensitive surface of the image sensing element and the working surface 8 is β, wherein the α is equal to the β.

In this embodiment or other embodiments, the mouse may be: during the using state of the horizontal type, the bottom portion of the housing is slid on the working surface or a gasket mounted on the bottom portion of the housing and configured to in contact with the working surface is slid on the working surface. During using state of the vertical type, the rear end of the housing is slid on the working surface or a gasket mounted on the rear end and configured to in contact with the working surface is slid on the working surface.

Second Embodiment

Figure 7:
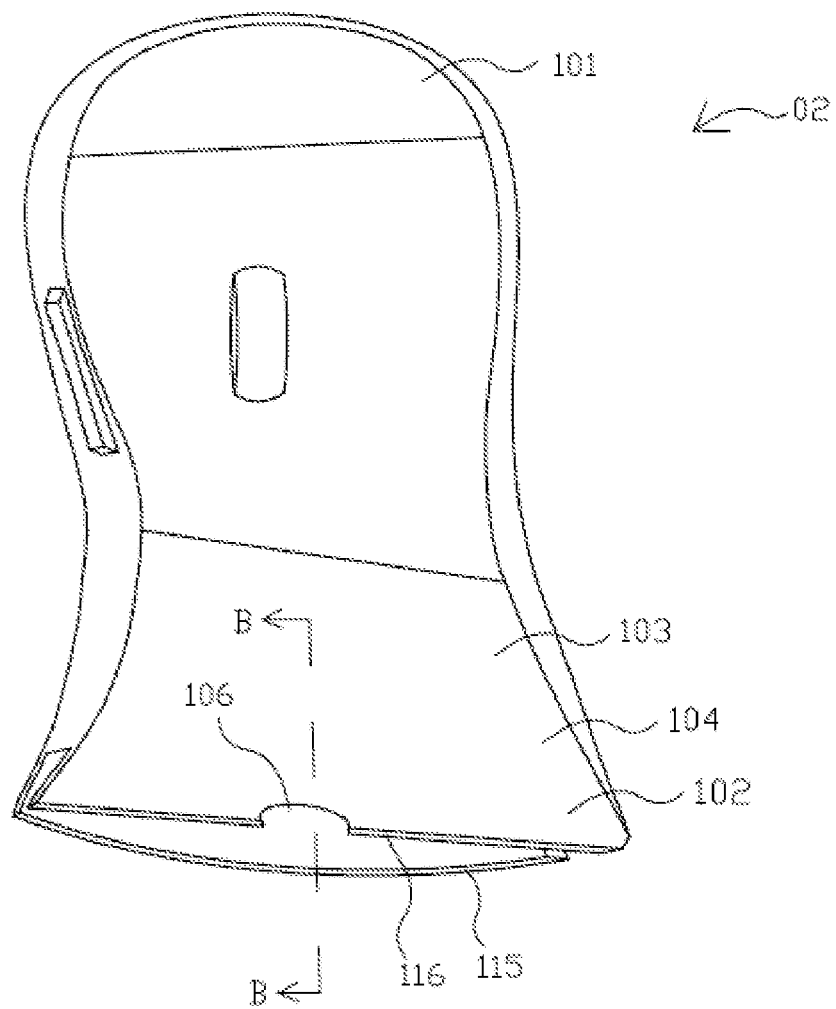
FIG. 7 is a perspective view of a bottom view of a mouse with a bottom surface facing upward according to a second embodiment of the present application.
Figure 8:
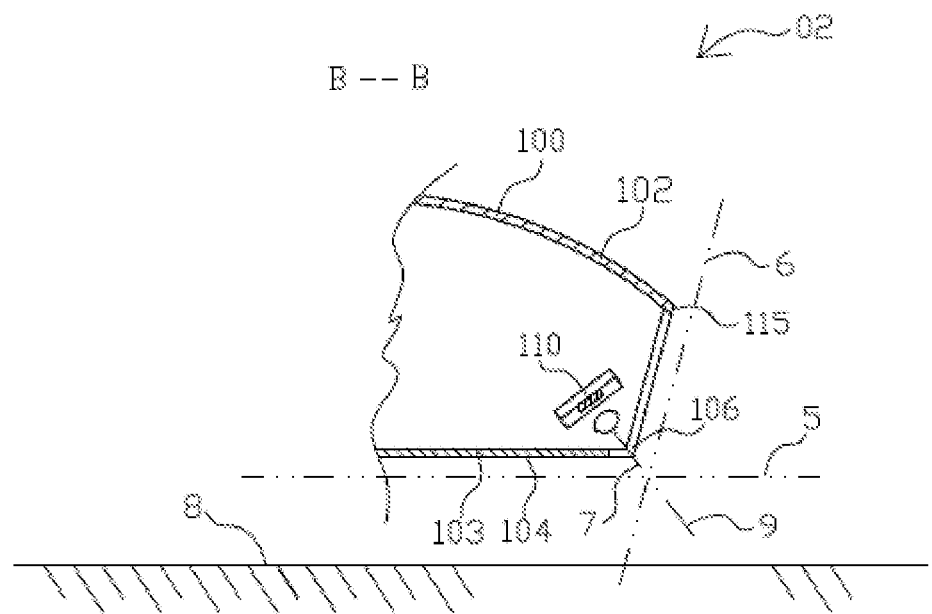
FIG. 8 is a schematic view of a housing, a light-transmitting hole, a lend, an image sensing element and the like in a state where the mouse is placed on the working surface to slide at a bottom of the housing thereof in the B-B cross-section shown in FIG. 8.

Please refer to FIGS. 7 and 8, in the present application, the main difference between the mouse 02 of the second embodiment and the mouse 01 of the first embodiment is that the rear end of the housing of the mouse 02 does not like the mouse 01 where the rear end surface of mouse 01 is intersected with the bottom portion of the housing to form an intersected entity edge, when the mouse is in a state being placed and slid onto the working surface with the bottom portion of the housing thereof to sense the moving of the cursor, the bottom 104 of the housing is slid on the working surface; and when the mouse 02 is in a state upright or oblique to the working surface with the front end of the housing being on the top and the rear end of the housing being on the bottom and the rear end of the housing being placed and slid onto the working surface to sense the movement of the cursor, the rear end surface 116 of the housing and the rear end surface 115 of the upper cover of the housing are in contact with the working surface so as to slide on the working surface. In the embodiment, the light-transmitting region 106 is disposed at an edge where a bottom surface 104 of the housing is intersected with an extending plane of a rear end surface 115 of the upper cover of the housing, which also produces the technical effect in the technical solution of the present application and is one of the embodiments of the application technical solution.

Figure 6:
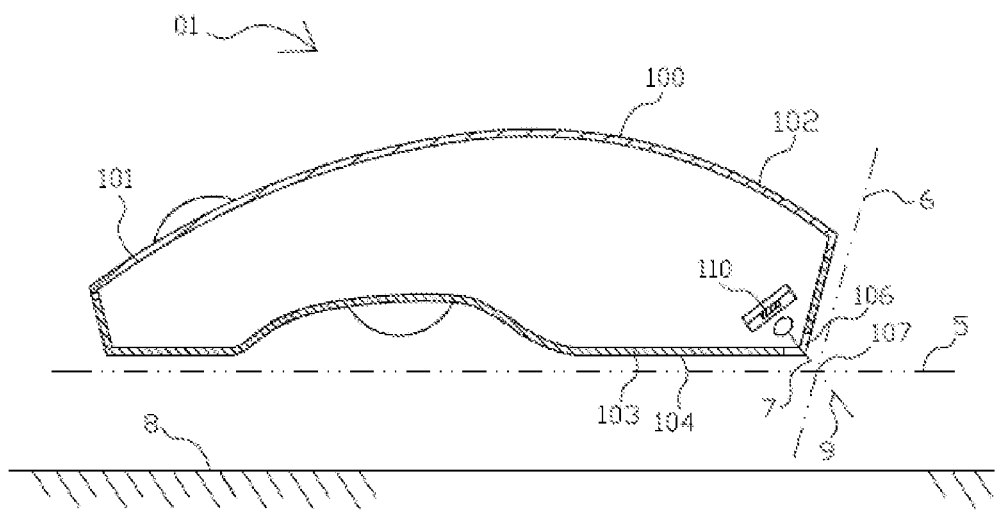
FIG. 6 is a schematic view in the A-A cross section shown in FIG. 3, in which shows the light-transmitting region disposed on the housing and located where the housing is intersected with a third plane, the third plane is defined by an edge intersecting a first plane and a second plane and a halving line of an angle of the first plane and the second plane; wherein the first plane is a plane on which the bottom portion of the housing contacts with a working surface when the mouse is placed on the working surface to slide at the bottom portion of the housing to sense the moving state of a cursor, and the second plane is a plane on which the bottom portion of the housing contacts with a working surface when the front end of the housing of the mouse is on the top and the rear end thereof is on the bottom, and the rear end of the housing is placed on the working surface to sense the moving state of the cursor.

Please refer to FIGS. 6 and 8, in combination with the mouse 01 of the first embodiment and the mouse 02 of the embodiment, it can be seen that the arrangement of the light-transmitting region can be substantially summarized as follows: a light-transmitting region 106 is disposed on the housing at a position where the housing 100 is intersected with a third plane 7, the third plane 7 is defined by an edge intersecting a first plane 5 and a second plane 6 and a center line 9 of an angle of the first plane and the second plane; the first plane 5 is a plane on which the bottom portion of the housing contacts with a working surface when the mouse is placed on the working surface to slide at the bottom portion of the housing to sense the moving state of a cursor, and the second plane 6 is a plane on which the bottom portion of the housing contacts with a working surface when the front end of the housing of the mouse being on the top and the rear end thereof being on the bottom, and the rear end of the housing is placed on the working surface to sense the moving state of the cursor.

Similarly, the mouse 02 is still arranged such that when the mouse is in a state being placed and slid onto the working surface with the bottom portion of the housing thereof to sense the moving of the cursor, an angle between the photosensitive surface of the image sensing element 110 and the working surface 8 is α, and when the mouse is in a state upright or oblique to the working surface with the front end of the housing being on the top and the rear end of the housing being on the bottom and the rear end of the housing being placed and slid onto the working surface, an angle between the photosensitive surface of the image sensing element and the working surface 8 is β, and wherein the α is equal to the β.

Third Embodiment

Figure 9:
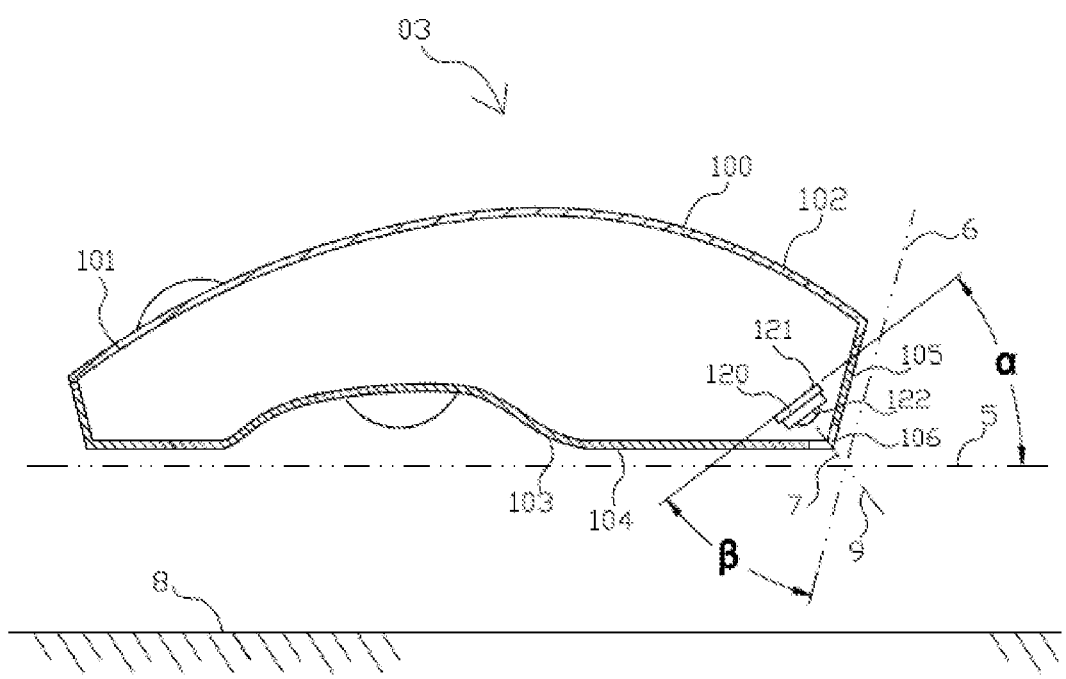
FIG. 9 is a schematic view of a longitudinal cross-section of a housing, a light-transmitting hole, a laser Doppler cursor positioning sensor, and the like in a state where the mouse is placed on the working surface to slide at a bottom of the housing thereof according to a third embodiment of the present application.

Please refer to FIG. 9, in the embodiment of the present application, the main difference between a mouse 03 of third embodiment and the mouse 01 of first embodiment is that: the mouse 03 uses the laser Doppler cursor positioning sensor 120 to position the cursor. The laser Doppler cursor positioning sensor 120 projects a light from the light-transmitting hole 106 to the working surface, and a reflected light is also fed back to the sensor through the light-transmitting hole 106. Similarly, the light-transmitting region 106 (the light-transmitting hole 106) is disposed on the housing at a position where the housing 100 is intersected with a third plane 7, the third plane 7 is defined by an edge intersecting a first plane 5 and a second plane 6 and a center line 9 of an angle of the first plane and the second plane; the first plane 5 is a plane on which the bottom portion of the housing contacts with a working surface when the mouse is in a state being placed and slid onto the working surface with the bottom portion of the housing thereof to sense the moving of the cursor, and the second plane 6 is a plane on which the bottom portion of the housing contacts with a working surface when the front end of the housing of the mouse is on the top and the rear end thereof is on the bottom, and the rear end of the housing is placed on the working surface to sense the moving state of the cursor.

In the usual application in the industry, the laser cavity and the lens of the cursor X-axis positioning unit of the laser Doppler cursor positioning sensor and the laser cavity and the lens of the cursor Y-axis positioning unit of the laser Doppler cursor positioning sensor are distributed in equal height on the package substrate of the sensor, the package substrate is typically parallel to the bottom plane 121 of the package housing of the sensor. Please refer to FIG. 9, the bottom plane 121 of the package housing of the laser Doppler cursor positioning sensor 120 is on the opposite side of the lens.

Therefore further, the laser Doppler cursor positioning sensor is disposed such that when the mouse is in a state being placed and slid onto the working surface with the bottom portion of the housing thereof to sense the moving of the cursor, an angle between a package substrate of the laser Doppler cursor positioning sensor and the working surface is α, and when the mouse is in a state upright or oblique to the working surface with the front end of the housing being on the top and the rear end of the housing being on the bottom and the rear end of the housing being placed and slid onto the working surface, an angle between the package substrate of the laser Doppler cursor positioning sensor and the working surface is β, and wherein the α is equal to the β. In order to be benefit for using state of the horizontal type and vertical type, and the sensitivity of the cursor positioning is consistent; which further be benefit for the data conversion of the X-axis and the Y-axis when the conversion of the two using states. The aforementioned swaying occurs in the using state of the vertical type, which is equivalent to a quick conversion between the two using states of the mouse, and thus such arrangement further facilitates avoiding a frame loss of the mouse in the using state of the vertical type.

In the design and manufacture of the finished mouse product, the laser Doppler cursor positioning sensor 120 is disposed such that when the mouse is in a state being placed and slid onto the working surface with the bottom portion of the housing thereof to sense the moving of the cursor, an angle between the bottom plane 121 of the package housing of the laser Doppler cursor positioning sensor 120 opposite to the lens 122 and the working surface is α, and when the mouse is in a state upright or oblique to the working surface with the front end of the housing being on the top and the rear end of the housing being on the bottom and the rear end of the housing being placed and slid onto the working surface to sense the movement of the cursor, an angle between the bottom plane 121 of the package housing of the laser Doppler cursor positioning sensor 120 opposite to the lens and the working surface is β, wherein the α is equal to the β.

The laser Doppler cursor positioning sensor is, for example, a laser Doppler sensor of the model PLN2032 manufactured by Philips.

As described in above first embodiment, in other embodiments of the present application, the light-transmitting region may be one of a group of a light-transmitting hole, a light-transmitting plate, a light-transmitting sheet and a light-transmitting slit. It can be seen that when the light-transmitting region is the light-transmitting hole, which can be the shape of various holes, such as square, oval, and special shaped.

As described in above second embodiment, and refer to FIGS. 7 and 8, the rear end of the housing of the mouse 02 does not like the mouse 01 where the rear end surface of mouse 01 is intersected with the bottom portion of the housing to form an intersected entity edge, when the mouse is in a state being placed and slid onto the working surface with the bottom portion of the housing thereof to sense the moving of the cursor, the bottom 104 of the housing is slid on the working surface; and when the mouse 02 is in a state upright or oblique to the working surface with the front end of the housing being on the top and the rear end of the housing being on the bottom and the rear end of the housing being placed and slid onto the working surface to sense the movement of the cursor, the rear end surface 116 of the housing and the rear end surface 115 of the upper cover of the housing are in contact with the working surface so as to slide on the working surface. In the embodiment, the light-transmitting region 106 is disposed at an edge where a bottom surface 104 of the housing is intersected with an extending plane of a rear end surface 115 of the upper cover of the housing; while the rear end of the housing is a large opening without a rear cover, is can be seen that the opening of the rear end is in communication with the light-transmitting region 106, it should be appreciated that the light-transmitting region 106 refers to a region configured for the lens to receive the reflected light of the working surface.

As mentioned above, in combination with the mouse 01 of the first embodiment and the mouse 02 of the second embodiment, it can be seen that the arrangement of the light-transmitting region can be substantially summarized as follows: a light-transmitting region 106 is disposed on the housing at a position where the housing 100 is intersected with a third plane 7, the third plane 7 is defined by an edge intersecting a first plane 5 and a second plane 6 and a center line 9 of an angle of the first plane and the second plane; the first plane 5 is a plane on which the bottom portion of the housing contacts with a working surface when the mouse is placed on the working surface to slide at the bottom portion of the housing to sense the moving state of a cursor, and the second plane 6 is a plane on which the bottom portion of the housing contacts with a working surface when the front end of the housing of the mouse is on the top and the rear end thereof is on the bottom, and the rear end of the housing is placed on the working surface to sense the moving state of the cursor. This includes being suitable for a case where the bottom surface of the mouse of a certain embodiment is a special-shaped curved surface the mouse has a plurality of bottom surfaces, or a case where the rear end surface of the mouse of a certain embodiment is a special-shaped curved surface or the mouse has a plurality of rear end surfaces. Referring back to the first embodiment, in the first embodiment, when the mouse 01 is placed on the working surface with the bottom portion of the housing thereof, the bottom surface 104 of the housing contacts the working surface 8 and slides on the working surface, then the first plane 5 is the bottom surface 104 of the housing; when the mouse 01 is placed on the working surface 8 to slide with the front end of the housing being on the top and the rear end of the housing being on the bottom and the rear end surface 105 of the housing being slid on the working surface, then the second plane 6 is the rear end surface 105 of the housing; and the edge where the first plane 5 intersecting with the second plane 6 is the edge 107 where the bottom surface 104 of the housing intersecting with the rear end surface 105 of the housing. It should be appreciated that there are other embodiments that are also within the scope of the present application, which includes that the edge has a segment included in the light-transmitting region 106; or a portion of the edge is included in the light-transmitting region 106, this is especially the case when the edge where the bottom surface of the housing of a mouse intersects with the rear end surface of the housing is a solid body edge having a large rounded; other embodiments further including a case that the light-transmitting region 106 is adjacent to the edge as long as the lens obtains the reflected light of the working surface through the same light-transmitting region, when the mouse is in a state being placed and slid onto the working surface with the bottom portion of the housing thereof to sense the moving of the cursor, and when the mouse is in a state upright or oblique to the working surface with the front end of the housing being on the top and the rear end of the housing being on the bottom and the rear end of the housing being placed and slid onto the working surface to sense the movement of the cursor.

Fourth Embodiment

Figure 10:
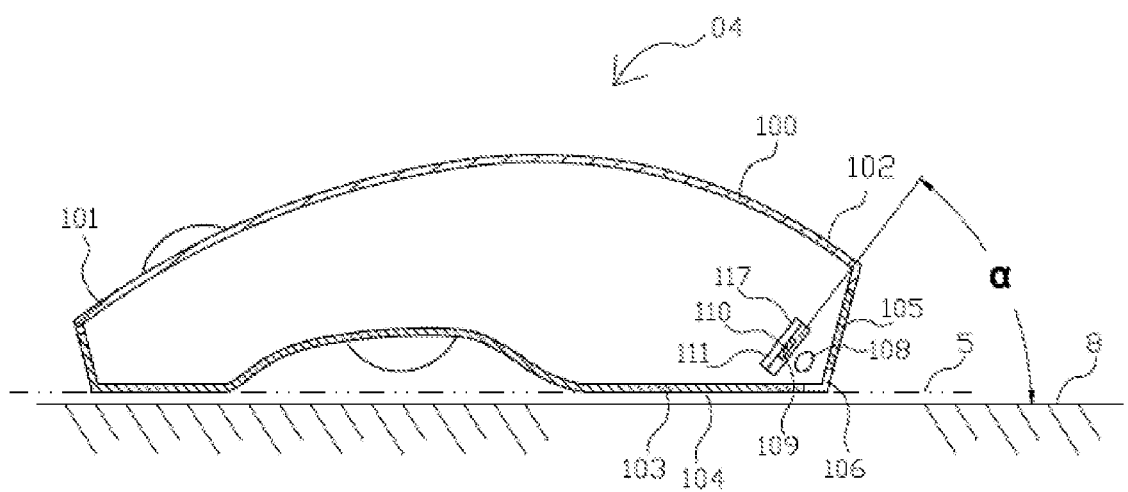
FIG. 10 is a schematic view of a longitudinal cross-section of a housing, a light-transmitting hole, a lens, an image sensing element, and the like in a state where the mouse is placed on the working surface to slide at a bottom of the housing thereof according to a fourth embodiment of the present application; in which the reference numerals marked with the same reference numerals in FIG. 4 are identical in name and are only the same in name.
Figure 11:
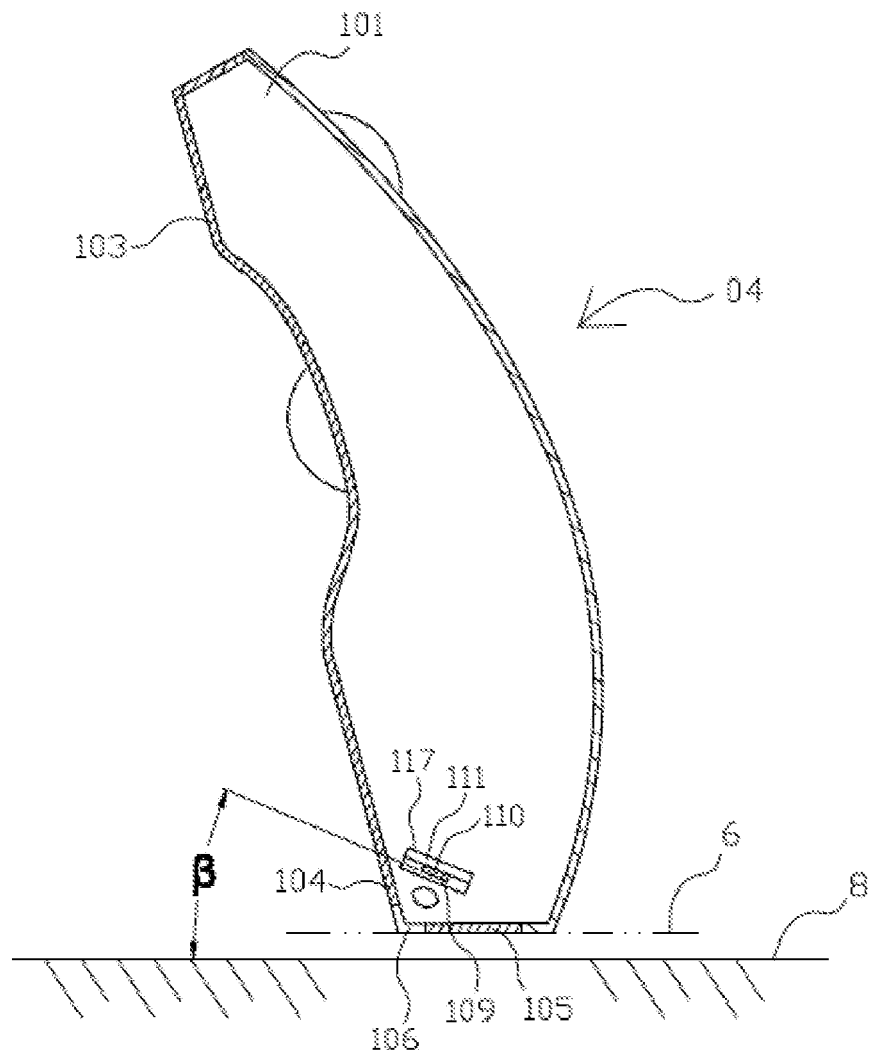
FIG. 11 is a schematic view of a longitudinal cross-section of a housing, a light-transmitting hole, a lens, an image sensing element, and the like in a state where the mouse is upright or oblique to the working surface with the front end of the housing being on the top and the rear end of the housing being on the bottom and the rear end of the housing being placed and slid onto the working surface according to a fourth embodiment of the present application; in which the reference numerals marked with the same reference numerals in FIG. 5 are identical in name and are only the same in name.

Please refer to FIGS. 10 and 11, the main difference between the mouse 04 of the fourth embodiment and the mouse 01 of the first embodiment is that the mouse is in a state being placed and slid onto the working surface e at the bottom portion of the housing thereof to sense the moving of the cursor, an angle between the photosensitive surface 109 of the image sensing element 110 and the working surface 8 is α; the mouse is in a state upright or oblique to the working surface with the front end of the housing being on the top and the rear end of the housing being on the bottom and the rear end of the housing being placed and slid onto the working surface, an angle between the photosensitive surface 109 of the image sensing element and the working surface 8 is β, and wherein the α is not equal to the β, but the angle difference of α and β is within 30 degrees. Such an arrangement, the mouse may not be consistent in sensitivity between the horizontal type operation and the vertical type operation. However, the image sensing element still obtains the image on the working surface through the same light-transmitting hole 106, and is also beneficial for preventing the mouse from frame loss when shaking in the vertical operation state. When the angle difference of α and β is exceeded 30 degrees, the difference of sensitivity of the mouse is larger, which may not beneficial for the cursor to run smoothly when conversion between the two operating states described.

Fifth Embodiment

Figure 12:
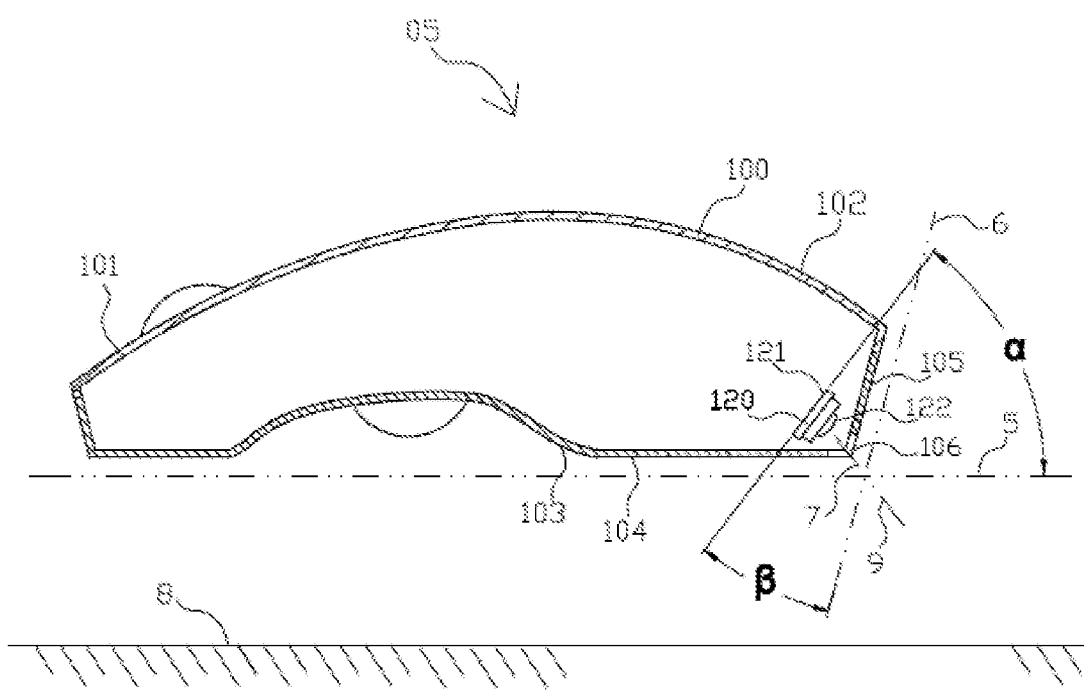
FIG. 12 is a schematic view of a longitudinal cross-section of a housing, a light-transmitting hole, a laser Doppler cursor positioning sensor, and the like in a state where the mouse is placed on the working surface to slide at a bottom of the housing thereof according to a fourth embodiment of the present application; in which the reference numerals marked with the same reference numerals in FIG. 9 are identical in name and are only the same in name.

Please refer to FIG. 12, the main difference between the mouse 05 of the fifth embodiment and the mouse 03 of the third embodiment is that:

The laser Doppler cursor positioning sensor is disposed such that when the mouse is in a state being placed and slid onto the working surface with the bottom portion of the housing thereof to sense the moving of the cursor, an angle between a package substrate of the laser Doppler cursor positioning sensor and the working surface is α, and when the mouse is in a state upright or oblique to the working surface with the front end of the housing being on the top and the rear end of the housing being on the bottom and the rear end of the housing being placed and slid onto the working surface, an angle between the package substrate of the laser Doppler cursor positioning sensor and the working surface is β, and wherein the α is not equal to the β, but the angle difference of α and β is within 30 degrees.

Alternatively, the laser Doppler cursor positioning sensor is disposed such that when the mouse is in a state being placed and slid onto the working surface with the bottom portion of the housing thereof to sense the moving of the cursor, an angle between the bottom plane of the package housing of the laser Doppler cursor positioning sensor opposite to the lens and the working surface is α, and when the mouse is in a state upright or oblique to the working surface with the front end of the housing being on the top and the rear end of the housing being on the bottom and the rear end of the housing being placed and slid onto the working surface to sense the movement of the cursor, an angle between the bottom plane of the package housing of the laser Doppler cursor positioning sensor opposite to the lens and the working surface is β, and wherein the α is not equal to the β, but the angle difference of α and β is within 30 degrees.

Such an arrangement, the laser Doppler cursor positioning sensor still obtains the reflected light on the working surface through the same light-transmitting hole 106 during the horizontal type operation state and the vertical type operation state, although the sensitivity of the mouse may not be consistent during the two operation states. When the angle difference of α and β is exceeded 30 degrees, the difference of sensitivity of the mouse is larger, which may not beneficial for the cursor to run smoothly when conversion between the two operating states described.

The aforementioned embodiments are only preferred embodiments of the present application. For one of ordinary skill in the art, according to the thought of the present application, specific implementation modes and application scopes may be modified, and the content of the specification should not be interpreted as any limitation to the present application.

What is claimed is:

1. A mouse, comprising:
   a housing, comprising a bottom portion, a front end and a rear end;
   an image sensing element, comprising a photosensitive surface; and
   a lens;
   wherein further provides a light-transmitting region disposed at the housing and located where the housing is intersected with a third plane, the third plane is defined by an edge intersecting a first plane and a second plane and a halving line of an angle of the first plane and the second plane; wherein the first plane is a plane on which the bottom portion of the housing contacts with a working surface when the mouse is in a state being placed and slid onto the working surface with the bottom portion of the housing to sense a moving of a cursor, and the second plane is a plane on which the rear end of the housing contacts with a working surface when the mouse is in a state being placed and slid onto the working surface to sense the moving of the cursor with the front end of the housing being on a top and the rear end thereof being on a bottom, and the rear end of the housing being placed on the working surface; and
   wherein a light source is further provided to emit a light beam from the light-transmitting region to the working surface, and the lens is configured to focus a reflected light of the light beam from the working surface to transmit it to the image sensing element through the light-transmitting region;
   or alternatively, the mouse comprising:
   a housing, comprising a bottom portion, a front end and a rear end; and
   a laser Doppler cursor positioning sensor;
   wherein further provides a light-transmitting region disposed at the housing and located where the housing is intersected with a third plane, the third plane is defined by an edge intersecting a first plane and a second plane and a halving line of an angle of the first plane and the second plane; wherein the first plane is a plane on which the bottom portion of the housing contacts with a working surface when the mouse is in a state being placed and slid onto the working surface with the bottom portion of the housing to sense a moving of a cursor, and the second plane is a plane on which the rear end of the housing contacts with a working surface when the mouse is in a state being placed and slid onto the working surface to sense the moving of the cursor with the front end of the housing being on a top and the rear end thereof being on a bottom, and the rear end of the housing being placed on the working surface; and
   wherein the laser Doppler cursor positioning sensor is configured to project a light from the light-transmitting region to the working surface, and a reflected light is also fed back to the sensor through the light-transmitting region.

2. The mouse of claim 1, wherein the image sensing element is configured such that when the mouse is in a state being placed and slid onto the working surface with the bottom portion of the housing thereof to sense the moving of the cursor, an angle between the photosensitive surface of the image sensing element and the working surface is $\alpha$, and when the mouse is in a state upright or oblique to the working surface with the front end of the housing being on the top and the rear end of the housing being on the bottom and the rear end of the housing being placed and slid onto the working surface, an angle between the photosensitive surface of the image sensing element and the working surface is $\beta$, and wherein the $\alpha$ is equal to the $\beta$;
   or, the laser Doppler cursor positioning sensor is configured such that when the mouse is in a state being placed and slid onto the working surface with the bottom portion of the housing thereof to sense the moving of the cursor, an angle between a package substrate of the laser Doppler cursor positioning sensor and the working surface is $\alpha$, and when the mouse is in a state upright or oblique to the working surface with the front end of the housing being on the top and the rear end of the housing being on the bottom and the rear end of the housing being placed and slid onto the working surface, an angle between the package substrate of the laser Doppler cursor positioning sensor and the working surface is $\beta$, and wherein the $\alpha$ is equal to the $\beta$.

3. The mouse of claim 1, wherein the image sensing element is configured such that when the mouse is in a state being placed and slid onto the working surface with the bottom portion of the housing thereof to sense the moving of the cursor, an angle between the photosensitive surface of the image sensing element and the working surface is $\alpha$, and when the mouse is in a state upright or oblique to the working surface with the front end of the housing being on the top and the rear end of the housing being on the bottom and the rear end of the housing being placed and slid onto the working surface, an angle between the photosensitive surface of the image sensing element and the working surface is $\beta$, and wherein the angle difference of $\alpha$ and $\beta$ is within 30 degrees;
   or, the laser Doppler cursor positioning sensor is configured such that when the mouse is in a state being placed and slid onto the working surface with the bottom portion of the housing thereof to sense the moving of the cursor, an angle between a package substrate of the laser Doppler cursor positioning sensor and the working surface is $\alpha$, and when the mouse is in a state upright or oblique to the working surface with the front end of the housing being on the top and the rear end of the housing being on the bottom and the rear end of the housing being placed and slid onto the working surface, an angle between the package substrate of the laser Doppler cursor positioning sensor and the working surface is $\beta$, and wherein the angle difference of $\alpha$ and $\beta$ is within 30 degrees.

4. The mouse of claim 1, wherein the image sensing element is configured to integrate having a flat front or rear surface of a package housing of an integrated IC of the image sensing element and such that when the mouse is in a state being placed and slid onto the working surface with the bottom portion of the housing thereof to sense the moving of the cursor, an angle between the photosensitive surface of the image sensing element and the working surface is $\alpha$, and when the mouse is in a state upright or oblique to the working surface with the front end of the housing being on the top and the rear end of the housing being on the bottom and the rear end of the housing being placed and slid onto the working surface to sense the movement of the cursor, an angle between the photosensitive surface of the image sensing element and the working surface is $\beta$, and wherein the $\alpha$ is equal to the $\beta$.

5. The mouse of claim 1, wherein the laser Doppler cursor positioning sensor is configured such that when the mouse is in a state being placed and slid onto the working surface with the bottom portion of the housing thereof to sense the moving of the cursor, an angle between a bottom plane of a package housing opposite to the lens of the laser Doppler cursor positioning sensor and the working surface is α, and when the mouse is in a state upright or oblique to the working surface with the front end of the housing being on the top and the rear end of the housing being on the bottom and the rear end of the housing being placed and slid onto the working surface to sense the movement of the cursor, an angle between the bottom plane of the package housing opposite to the lens of the laser Doppler cursor positioning sensor and the working surface is β, and wherein the α is equal to the β.

6. The mouse of claim 1, wherein the image sensing element is configured to integrate having a flat front or rear surface of a package housing of an integrated IC of the image sensing element and such that when the mouse is in a state being placed and slid onto the working surface with the bottom portion of the housing thereof to sense the moving of the cursor, an angle between the photosensitive surface of the image sensing element and the working surface is α, and when the mouse is in a state upright or oblique to the working surface with the front end of the housing being on the top and the rear end of the housing being on the bottom and the rear end of the housing being placed and slid onto the working surface to sense the movement of the cursor, an angle between the photosensitive surface of the image sensing element and the working surface is β, and wherein the angle difference of α and β is within 30 degrees.

7. The mouse of claim 1, wherein the laser Doppler cursor positioning sensor is configured such that when the mouse is in a state being placed and slid onto the working surface with the bottom portion of the housing thereof to sense the moving of the cursor, an angle between a bottom plane of a package housing opposite to the lens of the laser Doppler cursor positioning sensor and the working surface is α, and when the mouse is in a state upright or oblique to the working surface with the front end of the housing being on the top and the rear end of the housing being on the bottom and the rear end of the housing being placed and slid onto the working surface to sense the movement of the cursor, an angle between the bottom plane of the package housing opposite to the lens of the laser Doppler cursor positioning sensor and the working surface is β, and wherein the angle difference of α and β is within 30 degrees.

8. The mouse of claim 1, wherein the light-transmitting region is disposed at an edge where a bottom surface of the housing is intersected with a rear end surface of the housing.

9. The mouse of claim 1, wherein the light-transmitting region is disposed at an edge where a bottom surface of the housing is intersected with an extending plane of a rear end surface of the housing.

10. The mouse of claim 1, wherein the light-transmitting region may be one of a group of a light-transmitting hole, a light-transmitting plate, a light-transmitting sheet and a light-transmitting slit.

11. The mouse of claim 1, wherein the light-transmitting region is a light-transmitting hole, and a shape of the light-transmitting hole may be one of a group of square, an oval and a special-shaped.

12. The mouse of claim 1, wherein the light-transmitting region refers to a region configured for allowing the lens to receive a reflected light from the working surface.

13. The mouse of claim 1, wherein a central point of the light-transmitting region is exactly on the edge.

14. The mouse of claim 1, wherein the edge has a segment included in the light-transmitting region; or a portion of the edge is included in the light-transmitting region.

15. The mouse of claim 1, wherein the light-transmitting region is adjacent to the edge, when the mouse is in a state being placed and slid onto the working surface with the bottom portion of the housing thereof to sense the moving of the cursor and when the mouse is in a state upright or oblique to the working surface with the front end of the housing being on the top and the rear end of the housing being on the bottom and the rear end of the housing being placed and slid onto the working surface to sense the movement of the cursor, the lens obtains a reflected light of the working surface through the same light-transmitting region.

16. The mouse of claim 8, wherein the edge has a segment included in the light-transmitting region; or a portion of the edge is included in the light-transmitting region.

* * * * *